Patented Mar. 2, 1954

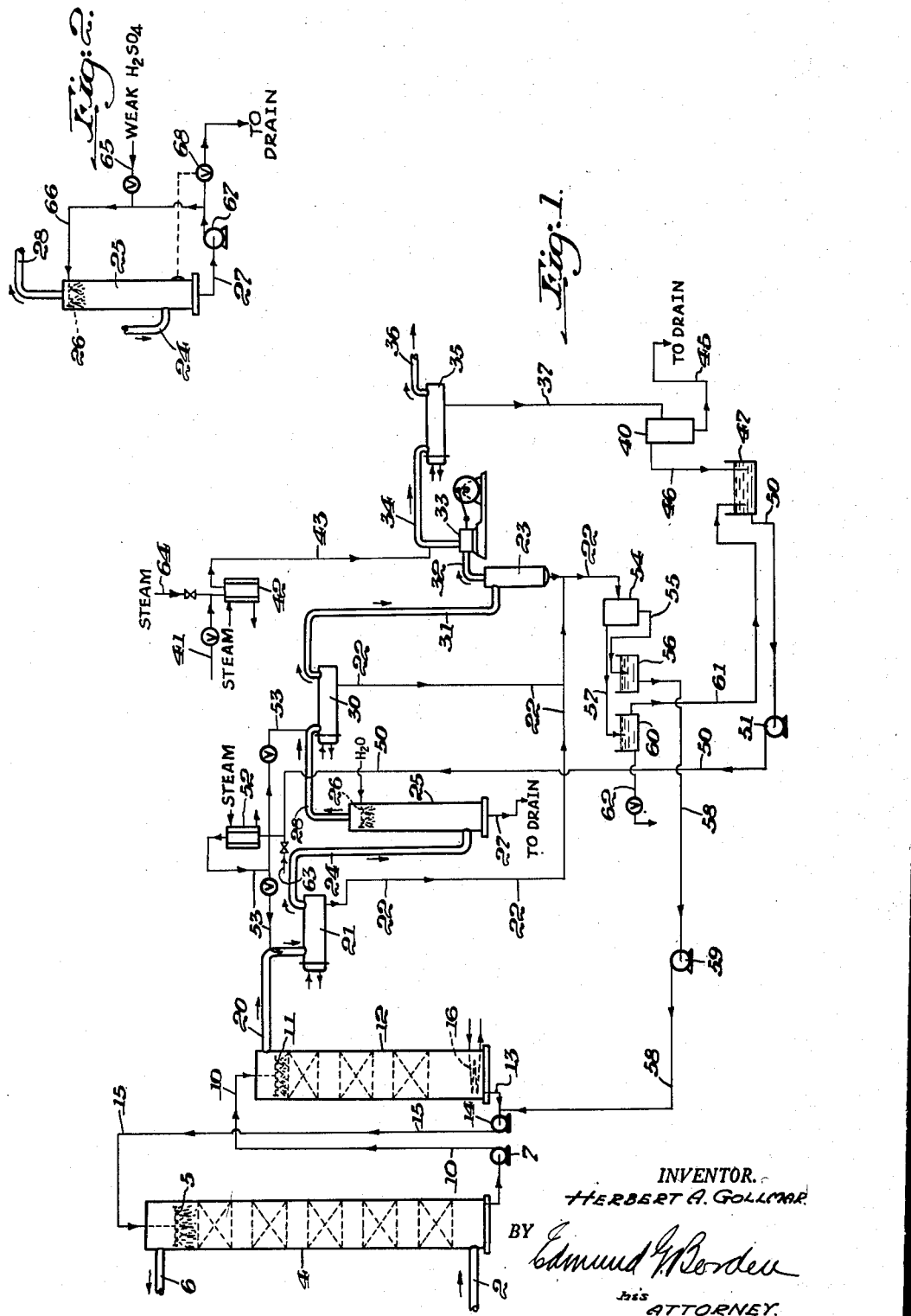

2,671,008

UNITED STATES PATENT OFFICE 2,671,008

SEPARATION OF ACID GASES FROM COAL CARBONIZATION GASES

Herbert A. Gollmar, Pittsburgh, Pa., assignor to Koppers Company, Inc., a corporation of Delaware Application January 6, 1950, Serial No. 137,137

5 Claims. (Cl. 23—3)

This invention relates to the separation of acid vapors, such as hydrogen sulphide, hydrogen cyanide and carbon dioxide from the vapors released from the alkaline absorption solution of the hot-vacuum-actification process for purifying fuel gases such as coal-carbonization gases that may still also contain small amounts of ammonia.

The hot-vacuum-actification process of separating acid gases from, for example, coke oven gases comprises broadly—absorbing the acid gases such as $H_2S$, HCN and $CO_2$ in an alkali-metal carbonate solution in a scrubber, then heating the alkaline solution under a high vacuum in an actifier to drive the acid gases out of the absorption solution. At the same time the absorption solution is regenerated so that the solution may be returned to the scrubber in a closed cycle. This hot-vacuum-actification process is described in detail in the patent to Sperr 1,533,773 issued April 14, 1925.

An alkaline metal carbonate solution is employed to absorb the acid gases from coke oven gas and when this fouled solution is heated under a vacuum to remove the acid gases a very large volume of water vapor is formed so that it is necessary to separate the water vapor from the acid gas before the acid gases can be further separated and refined.

The following example will illustrate the problem involved in recovering the acid gases from a coke oven gas. The volume of vapors removed from the actifier under vacuum (4 inches of mercury absolute pressure) was approximately 6,250,000 cubic feet per hour. This large volume of vapors was then passed through two condensers to a vacuum pump and the gases passing through the vacuum pump were cooled while bringing the pressure to approximately 4 lbs. gauge. In the first condenser about 34,100 lbs. of water per hour were condensed to reduce the gases and vapor leaving the condenser to 300,000 cubic feet per hour. In the second condenser 252 lbs. of water per hour were removed and the volume of uncondensed vapors was reduced to 174,000 cubic feet per hour. In the condenser after the vacuum pump, 9 lbs. of water per hour were separated and the volume of the remaining vapors and gases was approximately 11,000 cubic feet per hour. Thus, it will be seen that the removal of water involved the contraction of the volume of vapors from 6,250,000 cubic feet to 11,000 cubic feet per hour.

The problem of separating the water vapor from the acidic gases is complicated further because a small amount of ammonia and high melting point hydrocarbons, such as naphthalene and phenanthrene, which must be removed from the coke oven gases in the scrubber later, contaminate the separated acidic gases. Although the concentration of the ammonia and high melting point hydrocarbons in the vapors leaving the actifier may be low, it will be seen that when the volume is reduced so greatly by the removal of water, the concentration of these contaminants rapidly builds up in the residual acidic gases. The high melting-point-compounds precipitate in the tubes and parts of the condensers and ammonia-promoted polymer compounds act to clog orifices and vapor passages. It is important, therefore, that these contaminants be removed in order to permit an efficient separation of the water vapor from the acidic gases.

The Denig U. S. Patent No. 2,458,505, issued January 11, 1949, proposed removing the aforesaid contaminants in the actifier vapors of a hot-vacuum-actification process by a method comprising two steps of indirect cooling with an intermediate step of scrubbing the vapors from the first cooling step by direct contact with a solvent wash oil whereby anthracene, naphthalene, and the like, were absorbed from said vapors. In the first said step of indirect cooling, the temperature of the effluent vapors is maintained above the dew-point of naphthalene, and the like, so that the passageways in the condenser for chilling the vapors and acidic gases remain unobstructed; obstructions would of course develop even if a relatively minor amount of said hydrocarbons were only slowly allowed to deposit on the walls of the condenser tubes. In the scrubbing step with wash oil, and depending upon the efficiency of the contact between it and those actifier vapors effluent to the first cooling step, the naphthalene, anthracene, and the like, are removed from said vapors sufficiently that the condenser-tubes in the second cooling step remain free of the condensible said hydrocarbons under all operating conditions.

This prior process of the said Denig U. S. patent limits the extent to which the actifier vapors can be chilled in the first said cooling step therefor—the concentration of condensible hydrocarbons being the determining factor. Also, in the practice of the process, the temperatures in the cooler-condenser and the dew-point of the actifier vapors in respect of condensible vapors should be periodically observed, if the condensers are assuredly to remain unobstructed over prolonged operating periods.

It has now been found according to the present invention that these limitations and certain other restrictions of this prior process are in greater part eliminated and the operation of the condensers is made less sensitive to fluctuations of temperature and of the dew-point of the actifier vapors in respect of their said hydrocarbon content if the steps of cooling and the treatment of the vapors with a solvent oil are performed simultaneously in the same single, or a plurality of, indirect condensers.

It has also been discovered that a relatively minor amount of ammonia that may be fortuitously either continuously or periodically present in the actifier vapors can polymerize with other constituents of said vapors and give reaction products that also deposit in the condensers and thus lead to obstruction of their vapor-passageways, and especially in that condenser for cooling the vapors following their compression by the employed vacuum pump. According to the present invention therefore, provision is also made for removing the ammonia from the actifier vapors both efficiently and at an advantageous point in the steps of the present improved process.

The primary object of the present invention is therefore to provide an improved process of separating acidic gases set free in the hot-vacuum-actification process so that the equipment used in refining the acidic gases will not be rendered inoperative over a wide range of operating conditions by contaminating compounds such as naphthalene, phenanthrene and ammonia.

A further object of the invention is to provide a process of refining the acid gases of the hot-vacuum-actification process by which the contaminating ingredients may be removed from the vapors by the use of a comparatively small amount of solvents.

Another object of the invention is to provide a process of separating small amounts of ammonia contaminants from the acidic gases of the hot-vacuum-actification process to avoid the formation of resins which clog condenser tubes, valves and other orifices.

With these and other objects in view the present invention consists in the improved process of refining hot actification process vapors to separate the vapors from water and other contaminants.

According to the present improvement in a process for removing acidic gases from the actifier vapors of a hot-vacuum-actification process for purifying a fuel gas containing hydrogen sulphide, hydrogen cyanide, and the like, along with minor amounts of compounds of high melting point such, for example as naphthalene, phenanthrene, and may also contain small amounts of ammonia, there is vaporized into said actifier vapors, prior to a cooling step for condensing water vapor therefrom, in order to concentrate their content of said acidic gases, a sufficient quantity of an oil, that is a solvent for naphthalene, phenanthrene, and the like, and is condensible in a subsequent cooling step, to prevent said compounds being precipitated in solid form in the employed cooler-condenser apparatus. The present improvement thus simplifies operation of such condenser equipment, permits employment of a lower range of cooling temperatures than is otherwise the case and without clogging of the passageways of the condensers, thereby assuring uninterrupted operation of the installation.

The various features of the invention are illustrated in the accompanying drawings in which—

Figure 1 is a diagrammatic flow sheet of the hot-vacuum-actification process and the apparatus employed in refining the actified vapors to separate them from water and contaminants.

Figure 2 is a diagrammatic view of an alternative absorber arrangement for removing ammonia from the actification vapors.

Referring to the drawing, Figure 1, the improved process of the present invention may be outlined as follows:

Coke oven gas which contains hydrogen sulphide, hydrogen cyanide, carbon dioxide, ammonia, phenanthrene, naphthalene and other constituents, is introduced into a scrubber 4 through an inlet pipe 2 and passes upwardly through the scrubber in counter-current circulation with an alkaline absorbing solution introduced into the top of the scrubber through a distributor 5. Preferably a mixture of sodium carbonate and sodium bicarbonate is used for absorbing the acid gases from the coke oven gas. The scrubbed coke oven gas leaves the top of the scrubber through an outlet 6. Fouled alkaline absorption liquid is drawn off from the bottom of the scrubber 4 by a pump 7 and is forced through a line 10 into a distributor 11 located in the top of an actifying tower 12.

In the actifying tower the fouled liquor is heated under a high vacuum of approximately 4 inches of mercury absolute pressure to drive off the constituents absorbed in the alkaline liquor in the scrubber. The alkaline liquor flows downwardly through the actifier 12 and is met with water vapors generated from the alkaline solution by heating coil 16. A very large amount of water is vaporized in the actifier and this water vapor flows upwardly through the actifier countercurrent to the alkaline solution to assist in releasing and stripping constituents absorbed by the alkaline solution in the scrubber. Revivified alkaline solution accumulates in the bottom of the actifier and is drawn off through a line 13 to a pump 14 and is then returned through a line 15 into the distributor 5 in the scrubber 4. Therefore the alkaline absorption solution is circulated in a closed cycle between the scrubber and the actifier in which the absorption solution is revivified. Since a large amount of water is removed in revivifying the alkaline solution, water is added to the revivified alkaline solution leaving the bottom of the actifier through a line 58, the water supplied through the line 58 being water that is condensed and separated from the actified vapors in the latter part of the refining operation, as will be hereinafter described.

The coke oven gas is delivered to the scrubber 4 in a heated condition which varies from 45° to 60° C. With the high partial vacuum in the actifier 12 (4 inches of mercury absolute) a temperature of approximately 55° C. exists in the actifier. Before the acidic gases are separated from the other actifier vapors all the actifier vapors are cooled to condense and separate the water therefrom. Accordingly the gases and vapors are passed through cooling condensers which are maintained under substantially the same pressure that exists in the actifier, this partial vacuum being produced by a vacuum pump which draws the treated vapors through the various condensers and an ammonia scrubber. The pressure in the actifier 12 may be varied between 3 to 9 inches of mercury absolute and the boiling temperature of the solution therein will vary accordingly.

Vapors leave the actifier through a vapor line 20 and enter a condenser 21 to be contracted in volume and to separate liquid water. In order to prevent the clogging of the condenser 21 due to precipitation of compounds such as naphthalene and phenanthrene in the form of solids, a solvent oil in the vapor form is introduced into the vapor line 20 in a manner to thoroughly mix the oil vapors with the actified vapors containing the water vapor.

An oil which has been found to be suitable for dissolving the high melting point hydrocarbons is a petroleum distillate which boils within the temperature range of 100° to 300° C. with the major portion boiling between 180° and 280° C. When the vapors of such an oil are mixed with the actifier vapors containing naphthalene and phenanthrene and the vapor mixture is subsequently cooled to condense water, the concentration of some of the naphthalene and phenanthrene vapors will be such that the vapors of oil, naphthalene and phenanthrene will condense together and the naphthalene and phenanthrene will be held in solution in the oil. This oil mixture will flow out of the condenser with the water so that the high-melting point hydrocarbons will not solidify to clog the condenser. As the water is condensed in the condensers the concentration of the high-melting point hydrocarbon vapors in the acidic gases increases. At the same time the temperature of the vapors is gradually lowered in the condensers so that some high-melting point hydrocarbon vapors will be removed in each condenser.

The oil for dissolving the contaminants is taken from a tank 47 and circulated through a line 50 by pump 51 into a vaporizer 52. The vaporizer has a steam jacket to heat oil passing therethrough and is connected through a line 53 which is maintained in open communication with the vapor line 20 so that the vacuum condition existing in the condenser will exist in the vaporizer 52. As the oil is introduced into the vaporizer 52 a small amount of live steam is supplied to the oil through a line 63 to assist in vaporizing the oil. The oil and water which is condensed in the condenser 21 is drawn off from the condenser through line 22 and passed into a separator 54. The oil and water stratify in the separator, the water being drawn off through a bottom line 55 and passed into a receiving tank 56.

The concentration of the high-melting point hydrocarbons in the oil in tank 60 may be so high that it is best not to recycle it back to the condensers 21 and 30. If the high-melting point hydrocarbons concentration in the oil is not high a part of the oil may be transferred through line 61 to the tank 47 to be recycled. Some oil preferably is drawn off through a line 62 and may be used as fuel or for other purposes. The water collecting in the receiver 56 is preferably circulated back to the scrubber 4 to make up the dilute alkaline absorbing solution. This water is drawn off from the receiver 56 through the line 58 by the pump 59.

After the volume of vapors has been reduced in the condenser 21 the concentration of any ammonia in the gas is increased to the point of where it is desirable to remove it to prevent the formation of polymers, such as resins and gums from the $H_2S$ and HCN. Therefore the vapors leaving the condenser 21 pass through a vapor line 24 into a scrubber 25. The vapors pass through the scrubber 25 countercurrent to a stream of water which is introduced into the condenser through a nozzle 26. The water introduced into the top of the scrubber 25 is maintained at the same temperature as the temperature of the vapors entering the bottom of the tower in order that there will be no condensation of vapors in the scrubber 25. The acid vapors leaving the condenser 21 have a temperature of 35° to 40° C. so that water at substantially the same temperature as the temperature of the acid vapors is used in scrubber 25 to avoid the addition of water to the vapors. The volume of water used is controlled to absorb sufficient ammonia to prevent resinification of the acid gases in the further treatment thereof while avoiding substantial absorption of hydrogen cyanide from the vapors. Water containing ammonia is removed from the scrubber through a line 27.

The acid vapors leaving the scrubber 25 will be substantially free of ammonia, or will have the ammonia reduced to such a point that it will not catalyze the polymerization of the HCN and $H_2S$ to form a semi-solid mass which tends to clog the vapor lines. This ammonia-free vapor flows through a line 28 into a second condenser 30 where the temperature is reduced about 10° C. and further water is condensed. As the vapors enter the condenser 30 oil vapors from the vaporizer 52 are introduced through a line 53 into the vapor line 28 to again supply oil vapors to be available for dissolving any naphthalene or phenanthrene in the vapors. The water and oil which are condensed in the condenser 30 flow through a line 22 to the separator 54 and these constituents are separated along with the water and oil removed from the condenser 21.

The major portion of the high melting point contaminants are removed in the condensers 21 and 30 so that the vapors are sufficiently free of contaminants after leaving the condenser 30 that they may pass through the vacuum pump without precipitation of the contaminants in the pump or lines leading to and from the pump. The vapors pass from the condenser 30 through a line 31 which connects with a trap 23 for trapping out any water or oil that may accompany the vapors. The trap 23 is connected with the condensate line 22. Vapors then pass out of the top of the trap 23 through a line 32 to a vacuum pump 33 where the pressure is raised to deliver the vapors through a vapor line 34 to a condenser 35 at a pressure of 4 to 12 lbs. gauge. In passing through the vacuum pump the vapors are heated in the range of 100° to 150° C. and must be cooled to remove the final amount of water dissolved therein. Since some high melting point contaminants yet remain in the vapors, oil is introduced through a line 43 into the vapor line 34. The oil introduced into the line 34 is the same type of oil that is vaporzied in the vaporizer 52 but such oil is fresh oil and substantially free of naphthalene and phenanthrene. This oil is introduced into a vaporizer 42 through a valved line 41 and live steam may be introduced into the oil through a line 64. The vaporizer is preferably steam heated and a small amount of live steam may be introduced to assist in circulating the oil in a vaporized or partially vaporized form through the line 43 into the vapors passing through the line 34. This fresh oil is used in large quantity compared to quantity of high melting point contaminants in the vapors and is very effective in removing the last traces of contaminants that would tend to clog condenser 35 and any lines through which the acid vapors may be circulated to the refining equipment. The water and oil collecting in the condenser 35 are removed through a line 37 and pass into a separator 40. Water is removed from the bottom of the separator through a line 45 and passes to a drain. The oil flows from the separator 40 through a line 46 into a receiver 47. This oil contains a small amount of high melting point contaminants separated in the condenser 35 and is preferably used for dissolving the high melting point contaminants passing through the condensers 21 and 30. Therefore this oil is supplied through the line 50 to the vaporizer 52.

The acid vapors, particularly hydrogen sulphide, hydrogen cyanide and carbon dioxide are delivered from the condenser 35 through a line 36 which may conduct the gases into the refining equipment for separating the constituents. The hydrogen cyanide is preferably dissolved in a large volume of cold water to be separated from the hydrogen sulphide and $CO_2$. The hydrogen cyanide may then be concentrated and separated from the water by distillation. The process and apparatus for separating the acid vapors is more particularly described and claimed in the patent to Mitchell, Hill and Gollmar, 2,419,225, issued April 22, 1947.

The removal of a small amount of ammonia from the gases in the scrubber 25 with water requires a comparatively large volume of water, particularly when the temperature of the water is such that hydrogen cyanide will not be absorbed from the vapors passing through the scrubber. If the amount of ammonia is large or varies widely, it has been found desirable to use an acid for scrubbing the ammonia out of the vapors. Dilute sulphuric acid may be used for this purpose and a comparatively small volume of acid which is introduced at the same temperature as the vapors entering the scrubber will be effective in taking out the ammonia.

In Figure 2 is illustrated a modification of the scrubber apparatus to use sulphuric acid. In this apparatus weak acid is introduced through a valve line 65 and passes through a line 66 into spray nozzles in the top of the scrubber. The dilute acid collects in the bottom of the scrubber 25 and is drawn off through a line 27 and pumped by a pump 67 back through the line 66 to the top of the scrubber. A float-controlled valve 68 is mounted in the line 66 which will allow the acid to drain from the line 66 if the level tends to rise above a desired point.

The above described process and apparatus is very effective in handling the problem of condensing a large volume of vapors of a liquid while also removing the vapors of solid contaminants therein which so seriously affect the operation of the equipment. Although substantial amounts of high-melting point contaminants are removed in condensers 21 and 30 experience has proved that the small amount of naphthalene which passes through the vacuum pump may be more troublesome than in other parts of the apparatus. Therefore the use of fresh naphthalene-free oil for removing the contaminants in condenser 35 is very important. All attempts which have been made heretofore to remove the contaminants in one condenser or scrubber have not been sufficiently effective to maintain the apparatus in continuous working condition without requiring the apparatus to be taken apart and frequently cleaned.

If desired the condensing capacity of the condensers 21 and 30 may be combined to form one condenser to take out water prior to passing the vapors to the vacuum pump. With this arrangement the ammonia scrubber would be located between the large condenser and the vacuum pump. It is important, however, to remove ammonia before the gases pass through the vacuum pump so that the ammonia will not act to resinify the acid gases while passing through the pump or through the condenser and refining apparatus beyond the pump.

In place of sulphuric acid to be used for scrubbing ammonia out of the acid vapors, other mineral acids may be used such as hydrochloric or phosphoric acids. When dilute hydrochloric and sulphuric acids are used for absorption it is necessary to use acid-resistant equipment for handling these acids.

The preferred form of the invention having been thus described, what is claimed as new is:

1. In a process for treating actifier gases from a hot-vacuum-actification process for the recovery of hydrogen sulphide and hydrogen cyanide from coke-oven gas which has been processed to remove therefrom most of the ammonia and part of the vapors of naphthalene and similar compounds originally present therein, said actification process comprising the steps of recirculating an aqueous alkaline absorbent solution in a closed cycle between a scrubber in which the gas is scrubbed by the aqueous absorbent solution and an actifier in which the aqueous absorbent solution is regenerated by heating at subatmospheric pressure together with the steps of passing the vapors discharged from said actifier through a plurality of condensers in series in each of which the vapors are cooled and also passing said vapors through a vacuum pump located intermediate two of said condensers, and thereafter recovering said acidic gases, the improvement which enables the foregoing process to be carried out continuously, said improvement comprising the steps of mixing the vapors supplied to each of said condensers after these vapors are discharged from the actifier with the vapors of an oil in which naphthalene is readily soluble and which condenses in substantially the same temperature range as that in which naphthalene precipitates, withdrawing all oil vapor condensates from the system except oil being recycled to a condenser, and recycling said oil in a manner by-passing the actifier.

2. The process of claim 1 in which the gases leaving the vacuum pump are mixed with vapors of additional said solvent and the mixture thus obtained passed through a further condensing zone in which the vapors of said solvent oil and water vapor are condensed.

3. The process of claim 1 in which the solvent oil added to the vapors passing from the vacuum pump to the further condensing zone is substantially free of naphthalene and in which the condensed oil thus obtained is separated from the condensed water and vaporized and added to the vapors passing from the actifier to the first condensing zone.

4. The process of claim 1 in which the solvent oil passing through the first mentioned condensing zone and condensed therein is withdrawn from the process.

5. In a process for pulling a vacuum on an actifier for regenerating aqueous alkaline absorbent utilized to absorb hydrogen sulfide and hydrogen cyanide from a coke-oven gas in which the stripped gas contains ammonia in addition to hydrogen cyanide and hydrogen sulfide, a small amount of naphthalene and a large quantity of water vapor and in which the water vapor is substantially condensed prior to the passage of the stripped gas into the vacuum pump used to pull the vacuum in order to reduce the volume of gases sufficiently to make it practical to pull the desired vacuum, the method of preventing plugging up of the condensers utilized for cooling the gas by the condensation of naphthalene therein and of preventing the gumming up of the vacuum pump by the formation of polymers therein which comprises vaporizing an oil boiling in the range of 100° to 300° C. into the stripped gas after this gas is discharged from the actifier but prior to its passage into the condensers utilized for cooling the gas, scrubbing the stripped gas with an absorbent for ammonia prior to the passage of the stripped gas into said vacuum pump, withdrawing all oil vapor condensates from the system except oil being recycled to a condenser, and recycling said oil in a manner by-passing the actifier.

HERBERT A. GOLLMAR.

References Cited in the file of this patent

UNITED STATES PATENTS

| Number | Name | Date |
| --- | --- | --- |
| 1,533,773 | Sperr, Jr. et al. | Apr. 14, 1925 |
| 1,584,920 | Weil | Aug. 11, 1925 |
| 1,624,206 | Bjerregaard | Apr. 12, 1927 |
| 1,654,782 | Bird | Jan. 3, 1928 |
| 1,672,630 | Thatcher | June 5, 1928 |
| 1,879,686 | Jaeger | Sept. 27, 1932 |
| 1,905,903 | Jaeger | Apr. 25, 1933 |
| 2,106,734 | Gollmar | Feb. 1, 1938 |
| 2,275,294 | Gollmar et al. | Mar. 3, 1942 |
| 2,458,505 | Denig | Jan. 11, 1949 |
| 2,464,824 | Mitchell et al. | Mar. 22, 1949 |

OTHER REFERENCES

Petroleum Dictionary, H. P. Porter, pp. 229, 258, Gulf Publishing Co., Houston, Texas 1930.